(12) United States Patent
Tiesler-Wittig

(10) Patent No.: US 6,481,881 B2
(45) Date of Patent: Nov. 19, 2002

(54) LIGHTING SYSTEM AND METHOD, AND MOTOR VEHICLE WITH A LIGHTING SYSTEM

(76) Inventor: Helmut Tiesler-Wittig, Schoenthaler Hof, 52379 Langerwehe (DE)

( * ) Notice: Subject to any disclaimer, the term of this patent is extended or adjusted under 35 U.S.C. 154(b) by 0 days.

(21) Appl. No.: 09/912,612

(22) Filed: Jul. 25, 2001

(65) Prior Publication Data

US 2002/0015313 A1 Feb. 7, 2002

(30) Foreign Application Priority Data

Jul. 26, 2000 (DE) .......................................... 100 36 300

(51) Int. Cl.[7] .............................. F21V 8/00; F21V 7/04
(52) U.S. Cl. ...................... 362/554; 362/263; 362/293; 362/511; 385/901
(58) Field of Search ................................. 362/554, 263, 362/231, 293, 510, 511, 487; 385/901; 315/77

(56) References Cited

U.S. PATENT DOCUMENTS

| | | | | |
|---|---|---|---|---|
| 4,048,486 A | * | 9/1977 | Kriege | ............................ 355/1 |
| 5,497,295 A | * | 3/1996 | Gehly | ......................... 362/250 |
| 5,526,237 A | | 6/1996 | Davenport et al. | ............ 362/32 |
| 6,193,401 B1 | * | 2/2001 | Girkin et al. | ................ 362/308 |

FOREIGN PATENT DOCUMENTS

| | | | | |
|---|---|---|---|---|
| EP | 0183921 A2 | 6/1986 | ............. | G01J/3/10 |
| EP | 0501669 A2 | 9/1992 | ............. | F21M/3/05 |

* cited by examiner

Primary Examiner—Sandra O'Shea
Assistant Examiner—Ali Alavi
(74) Attorney, Agent, or Firm—Frank Keegan

(57) ABSTRACT

A reliable lighting system is proposed for utilizing the advantages of a centralized light system, wherein at least one optical fiber for the transport of at least a portion of the light of the light sources to at least one light emission location is provided, one of the light sources being a high-intensity gas discharge lamp, in particular a xenon lamp, and the other light source being a halogen lamp.

13 Claims, 1 Drawing Sheet

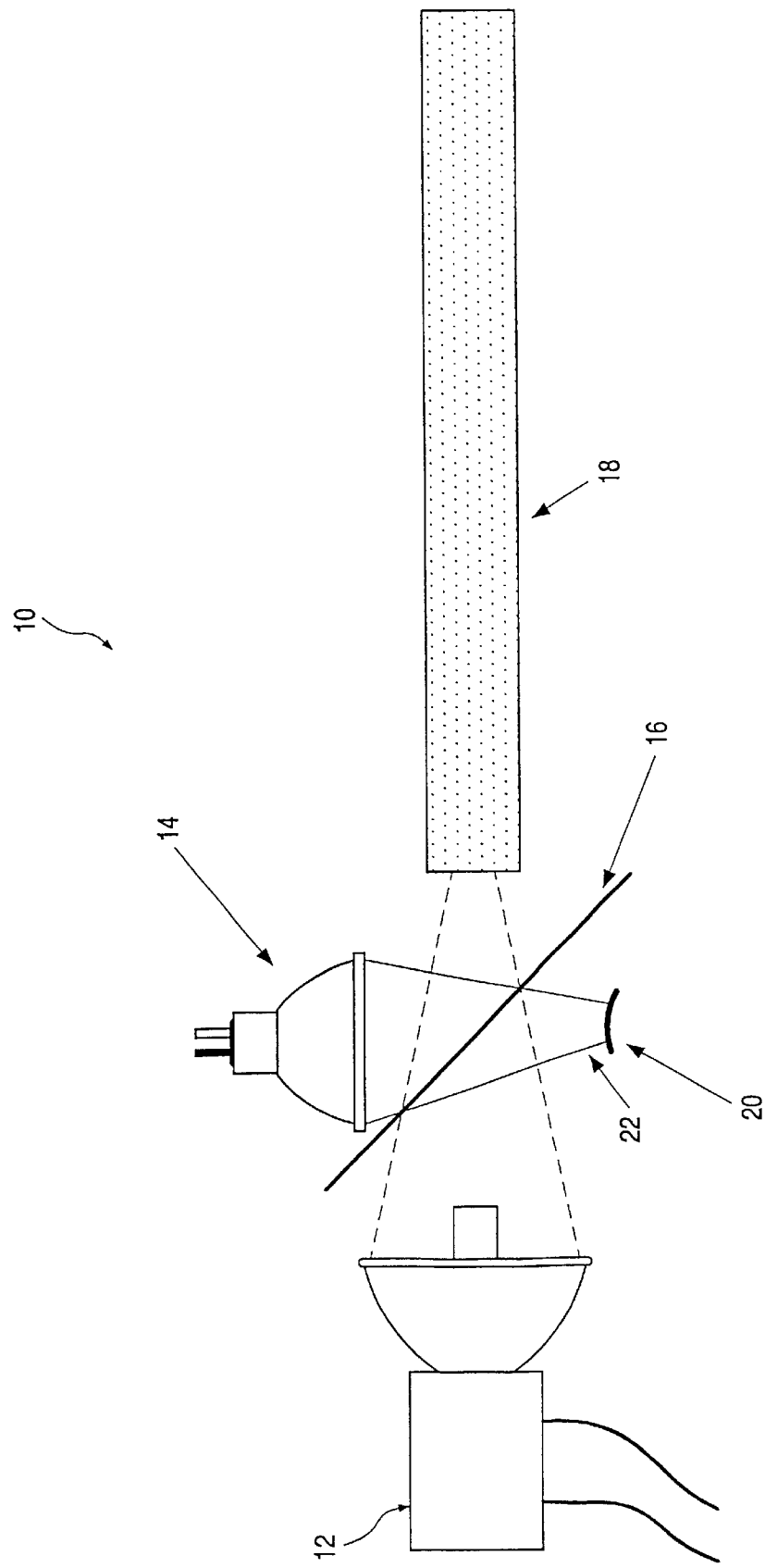

LIGHTING SYSTEM AND METHOD, AND MOTOR VEHICLE WITH A LIGHTING SYSTEM

The invention relates to a lighting system and a lighting method and to a motor vehicle with a lighting system wherein at least one optical fiber is provided and utilized for the transport of the light generated by a light source to a light emission location or several light emission locations.

Such systems and methods are known, for example, from EP 0 501 669 A2. Their object is in particular to replace the high-maintenance, vulnerable traditional lighting system with a plurality of individual light sources in motorized land vehicles, such as automobiles, with a low-maintenance system in which the light of a single strong light source is distributed in a desired manner by means of optical fibers, i.e. for example to the left and right front headlight and, if applicable, to the rear lights.

Although a centralized lighting system has a number of advantages over the systems comprising a plurality of individual light sources, such a system requires a high-power light source for the generation of a lumen level which is sufficient, for example, for the driving beam of a motor vehicle, for which purpose in particular high-intensity gas discharge lamps (HID lamps) with short light arcs such as, for example, xenon lamps were found to be suitable. Such high-intensity gas discharge lamps, however, disadvantageously show a characteristic run-up behavior and do not immediately make available the light power required, for example, for the driving beam or for operating the headlamp flasher signal. A further major disadvantage of the known systems with a single high-intensity gas discharge lamp is that a failure of this lamp, although it may indeed be easy to exchange, depending on the construction of the lighting system, means that until this lamp exchange takes place no light at all is available, which involves a considerable safety risk, for example in the case of night driving.

A lighting system is known from U.S. 5,526,237 in which two high-intensity gas discharge lamps are used for increasing the luminous intensity. If one of the lamps should fail, the light of the second high-intensity gas discharge lamp would still be available in this system. However, since both gas discharge lamps show the disadvantageous run-up behavior mentioned above, such a system is of limited use only in motor vehicles. The fact that in addition high-intensity gas discharge lamps have a short operational life in comparison with lamps of different construction leads to the risk that both lamps will fail one shortly after the other in the case of the use of two high-intensity gas discharge lamps as described in the cited U.S. patent.

The introductory description of EP 0 183 921 A2 mentions a lighting system for use in a solar simulator in which the light of a high-intensity gas discharge lamp, i.e. a xenon lamp, and a halogen incandescent lamp are combined with one another so as to simulate the spectral distribution of sunlight as exactly as possible. Such solar simulators serve in particular for the testing of solar cells and are accordingly used only in research laboratories. The light of the two lamps should here be combined in an exactly controlled manner such that the desired spectral distribution arises. The light is then radiated planarly onto a test sample, for example a solar cell.

In view of the above, the invention has for its object to provide a lighting system and method as well as a motor vehicle with a lighting system in which the advantages of a centralized lighting system are utilized, such that light is generated in one location and is transported through optical fibers to at least one light emission location, i.e. for example to the front and rear lights of a motor vehicle.

The object is achieved by means of a lighting system, in particular for motor vehicles, with at least two light sources and at least one optical fiber into which the light of the two light sources is introduced for the purpose of conducting at least a portion of the light of the light sources to at least one light emission location, wherein one of the light sources is a high-intensity gas discharge lamp, in particular a xenon lamp, and one of the light sources is a halogen lamp. The halogen lamp has the major advantage over the high-intensity gas discharge lamp that it makes available its maximum power within a fraction of a second after switching-on. In addition, the halogen lamp has a much longer useful life than a high-intensity gas discharge lamp.

This arrangement is particularly suitable in conjunction with at least two light emission locations, i.e. with at least two fibers, as is the case in motor vehicles.

In an advantageous embodiment of the invention, the contribution of the high-intensity gas discharge lamp to the total light output of the system is less than 90%, and lies preferably between 75 and 85%. The contribution of the halogen lamp to the total light output of the system should accordingly be more than 10% by preference, preferably between 15 and 25%. This guarantees a lighting level which is sufficient, for example, for night driving with a motor vehicle if the high-intensity gas discharge lamp should fail. In addition, such a system may be operated to advantage such that the halogen lamp remains permanently switched on during driving of a land vehicle fitted with such a lighting system, which has been shown to contribute to traffic safety.

As regards a motor vehicle, the above object is achieved by means of a vehicle, in particular a motor-driven land vehicle such as, for example, an automobile or a truck, fitted with such a lighting system.

As regards the method, the above object is achieved by means of a lighting method, in particular for use in motor vehicles, whereby the light of at least two light sources is introduced at least partly into at least one optical fiber and is conducted through the fiber to at least one light emission location, and whereby a halogen lamp and a high-intensity gas discharge lamp, in particular a xenon lamp, are used as the light sources.

It is possible here for achieving a first lighting state to introduce only the light of the halogen lamp at least partly into the optical fibers, and for achieving a second lighting state to introduce the light of the halogen lamp and of the high-intensity gas discharge lamp at least partly into the optical fibers.

Preferably, the light from the two light sources is introduced into the optical fiber via at least one beam splitter. The beam splitter is to be arranged in the radiation path of the two light sources in a suitable manner.

Preferably, the beam splitter is chosen to be selective as to wavelength and is arranged such that it filters out as much as possible the high infrared (IR) components and/or ultra-violet (UV) components of the halogen lamp, which components are not introduced into the fiber. If the light from the halogen lamp is thus introduced into the fiber through reflection by the beam splitter, then the beam splitter should be permeable to visible light and reflective to IR and UV light. It is safeguarded thereby that a substantial portion of the visible light from the high-intensity gas discharge lamp enters the fiber. On the other hand, if the light from the halogen lamp is introduced into the fiber through the beam splitter and the light from the high-intensity gas discharge lamp is reflected by the beam splitter and introduced into the fiber, then the beam splitter should preferably be chosen so as to be permeable to IR and UV light and to reflect visible light, so that also in this arrangement the major portion of the visible light of the high-intensity gas discharge lamp is introduced into the fibers. It is possible in such an arrangement to maximize the luminous efficiency. It is obvious that such a wavelength-selective beam splitter may also be advantageously utilized in a lighting system independently of the coupling of the light into an optical fiber.

Usually, a beam splitter has as its output not only the primary beam, which is conducted, for example, into the fiber, but also a secondary beam. Such a secondary beam would normally be lost for the lighting system. It is suggested for this reason that a reflector be provided which reflects this secondary beam back to the beam splitter so that at least portions of the secondary beam can be utilized. Since the lighting system operates in particular with visible light, this reflector should be constructed such that it reflects at least visible light.

Alternatively, or in addition, the secondary beam may be conducted to an absorber for UV or IR light, so that this is not reflected back to the lighting system and unnecessarily heats up the latter.

It is obvious that such a reflector or such an absorber advantageously increases the useful power utilization and prevents an overheating of the lighting system also independently of a fiber or independently of a wavelength-selective beam splitter.

Preferably, the reflector reflects the secondary beam in a focused manner towards at least one of the two light sources. The focus may here lie laterally of the actual light source in a reflector surrounding this light source, as is already the case in the present state of the art of motor vehicle reflectors, so that the light source does not obstruct a return of the focused secondary beam to the beam splitter by means of the light source reflector.

In addition, the lighting system may also comprise a switchable mirror which introduces light from the first light source and/or light from the second light source into the fiber, as desired. In such an arrangement, again, the redundancy according to the invention can be realized. Such a switchable mirror is known per se and is excited, for example, electrically.

It is obvious that such a switchable mirror may also be constructed so as to be dichroic—like a beam splitter—, so that a corresponding beam splitter may be controlled in a suitable manner and may be chosen to be reflective or permeable to certain wavelength ranges.

The run-up phase of the high-intensity gas discharge lamp or alternatively its failure may be used as a trigger for this switching, depending on the desired arrangement.

It is obvious that such a switchable mirror may also be used to advantage in a lighting system according to the invention independently of the introduction of the light into an optical fiber.

Further particulars and advantages of the invention will become apparent from the ensuing description of an embodiment, which is given purely by way of example and to which the invention is by no means limited, in conjunction with the drawing, where the sole Figure diagrammatically shows the input portion of a lighting system according to the invention with two light sources.

The Figure shows the input side, referenced 10 in its entirety, of a lighting system according to the invention, for example for use in an automobile. It comprises a first light source, i.e. a high-intensity gas discharge lamp in the form of a xenon lamp 12, and a second light source in the form of a halogen incandescent lamp 14, which are positioned such that their light can be introduced for at least the major portion thereof into a bundle of optical fibers 18, indicated diagrammatically only here, in the present embodiment with an interposed beam splitter 16.

The bundle of optical fibers 18, which is known per se, then subdivides itself in a manner not shown in any detail here, so that the fibers terminate in various locations, for example in the front and rear lamp assemblies of a motor vehicle, where the light introduced into the fibers issues from the fibers and can be used for lighting purposes, possibly with further interposed optical elements such as, for example, lenses and reflectors.

It was found to be particularly advantageous in this connection when the lamps 12 and 14 are so chosen that the high-intensity gas discharge lamp contributes less than approximately 80% of the total light output.

During operation of the system, light is immediately available thanks to the halogen lamp 14. If the high-intensity gas discharge lamp should fail, the halogen lamp 14 will always still be available as a redundant light source as a rule, because its expected life is longer than that of usual high-intensity gas discharge lamps.

If such a lighting system is used in land vehicles, the halogen lamp 14 may be used for the permanent low beam, which is already obligatory in many northern countries and which contributes to traffic safety, and may burn continuously.

The beam splitter 16 cooperates with a mirror 20 which is selective as to wavelength and which reflects visible light and transmits UV and IR light. Useful light leaving the beam splitter 16 in a secondary beam 22 is reflected again in this manner and is available for the lighting system. The focus is attuned here to the beam splitter 16 and to the reflectors of the light sources 12, 14 such that the focus of the reflected secondary beam 22 is not directly incident on the light sources themselves, so that this light can be reflected again by the reflectors of the light sources 12, 14 to the beam splitter 16 without being obstructed, thus increasing the total light output. A deviation of this kind, which will finally result in a wider light source, is compensated by the fiber 18.

What is claimed is:

1. A lighting system, in particular for motor vehicles, with at least two light sources (12, 14) and at least one optical fiber (18) into which the light of the two light sources is introduced for the purpose of conducting at least a portion of the light of the light sources to at least one light emission location, wherein one of the light sources is a high-intensity gas discharge lamp (12), in particular a xenon lamp, and wherein one of the light sources is a halogen lamp (14).

2. A lighting system as claimed in claim 1, characterized in that the contribution of the high-intensity gas discharge lamp (12) to the total light output of the system is less than 90%, and lies preferably between 75 and 85%.

3. A lighting system as claimed in claim 1, characterized in that the contribution of the halogen lamp (14) to the total light output of the system is more than 10%, and lies preferably between 15 and 25%.

4. A lighting system as claimed in claim 1, characterized in that at least one beam splitter (16) is arranged in the radiation path of the two light sources (12, 14) such that the introduced light is conducted from the light sources (12, 14) through the beam splitter (16) into the fiber (18).

5. A lighting system as claimed in claim 4, characterized in that the beam splitter (16) is chosen to be selective as regards wavelength.

6. A lighting system as claimed in claim 5, characterized in that the introduced light of the high-intensity gas discharge lamp (12) is fed into the fiber (18) through the beam splitter (16) and the introduced light of the halogen lamp (14) is reflected by the beam splitter (16) into the fiber (18), while the beam splitter (16) is chosen to be permeable to visible light and reflective to IR and UV light.

7. A lighting system as claimed in claim 5, characterized in that the introduced light of the halogen lamp (14) is fed into the fiber (18) through the beam splitter (16) and the introduced light of the high-intensity gas discharge lamp (12) is reflected by the beam splitter (16) into the fiber (18), while the beam splitter (16) is chosen to be permeable to IR and UV light and reflective to visible light.

8. A lighting system as claimed in claim 4, characterized in that a secondary beam (22) leaving the beam splitter (16) is directed to a reflector (20) for visible light and/or to an absorber (20) for UV or IR light.

9. A lighting system as claimed in claim 8, characterized in that the reflector (20) reflects the secondary beam (22) in a focused manner to at least one of the two light sources (12, 14).

10. A lighting system as claimed in claim 1, characterized by a switchable mirror which introduces light from the first light source (12) and/or light from the second light source (14) into the-fiber (18), as desired.

11. A lighting method, in particular for use in motor vehicles, whereby the light of at least two light sources is introduced at least partly into at least one optical fiber and is conducted through the fiber to at least one light emission location, and whereby a halogen lamp and a high-intensity gas discharge lamp, in particular a xenon lamp, are used as the light sources.

12. A lighting method as claimed in claim 11, wherein only the light of the halogen lamp is introduced at least partly into the optical fiber for achieving a first lighting state, and wherein for achieving a second lighting state the light of the halogen lamp and of the high-intensity gas discharge lamp is introduced at least partly into the optical fiber.

13. A lighting method as claimed in claim 11, wherein the light of the two light sources is fed into the optical fiber via at least one beam splitter.

* * * * *

UNITED STATES PATENT AND TRADEMARK OFFICE
CERTIFICATE OF CORRECTION

PATENT NO.     : 6,481,881 B2
DATED          : November 19, 2002
INVENTOR(S)    : Helmut Tiesler-Wittig It is certified that error appears in the above-identified patent and that said Letters Patent is hereby corrected as shown below:

<u>Title page,</u>
Insert -- [73] Assignee: Koninklijke Philips Electronics N.V.,
                        Eindhoven (NL) --.

Signed and Sealed this

Twenty-third Day of September, 2003

JAMES E. ROGAN
*Director of the United States Patent and Trademark Office*